United States Patent
Gehrke et al.

(10) Patent No.: US 11,351,828 B2
(45) Date of Patent: Jun. 7, 2022

(54) METHOD FOR OPERATING A PRESSURE CONTROL SYSTEM WITH A MULTI-STAGE COMPRESSOR, AND PRESSURE CONTROL SYSTEM

(71) Applicant: WABCO GmbH, Hannover (DE)

(72) Inventors: Morten Gehrke, Wennigsen (DE); Uwe Stabenow, Laatzen (DE); Jonas Wichern, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 458 days.

(21) Appl. No.: 16/610,519

(22) PCT Filed: Apr. 12, 2018

(86) PCT No.: PCT/EP2018/059459
§ 371 (c)(1),
(2) Date: Nov. 4, 2019

(87) PCT Pub. No.: WO2018/202402
PCT Pub. Date: Nov. 8, 2018

(65) Prior Publication Data
US 2020/0148022 A1    May 14, 2020

(30) Foreign Application Priority Data

May 5, 2017    (DE) ..................... 10 2017 004 359.0

(51) Int. Cl.
*B60G 17/052*    (2006.01)
*B60G 17/015*    (2006.01)
*B60G 17/056*    (2006.01)

(52) U.S. Cl.
CPC ......... *B60G 17/015* (2013.01); *B60G 17/052* (2013.01); *B60G 17/056* (2013.01)

(58) Field of Classification Search
CPC ... B60G 17/015; B60G 17/052; B60G 17/056
(Continued)

(56) References Cited

U.S. PATENT DOCUMENTS 5,769,610 A * 6/1998 Paul ..................... F02B 63/06
62/505
5,863,186 A * 1/1999 Green ................... F04B 9/113
417/244
(Continued)

FOREIGN PATENT DOCUMENTS

DE        10321771 A1    12/2004
DE    102011083614 A1     9/2012
(Continued)

*Primary Examiner* — Toan C To
(74) *Attorney, Agent, or Firm* — Leydig, Voit & Mayer, Ltd.

(57) ABSTRACT

A method for operating a pressure control system having a multistage compressor. The method comprises providing a pressure medium compressed multiple times by the multistage compressor in order to fill a pressure medium reservoir or pressure medium chambers of the pressure control system, by performing (i) providing, by a first compression stage, a precompressed pressure medium and additionally compressing the precompressed pressure medium via a second compression stage, and/or (ii) introducing, into an intermediate volume between the first compression stage and the second compression stage of the multistage compressor, an already compressed charge pressure medium and compressing, by the second compression stage, the charge pressure medium again. An intermediate pressure of the precompressed pressure medium conveyed into the intermediate volume is limited by an overpressure valve interacting with the first compression stage. The overpressure valve is configured to open if the intermediate pressure exceeds a limit value.

13 Claims, 3 Drawing Sheets

(58) Field of Classification Search
USPC .................. 280/124.159, 124.16, 124.161
See application file for complete search history.

(56) References Cited

U.S. PATENT DOCUMENTS

| | | | | |
|---|---|---|---|---|
| 6,089,831 | A * | 7/2000 | Bruehmann | B60T 17/004 |
| | | | | 417/302 |
| 10,391,830 | B2 * | 8/2019 | Bohn | F04B 53/10 |
| 10,960,724 | B2 * | 3/2021 | Meier | B60G 17/052 |
| 10,961,999 | B2 * | 3/2021 | Stabenow | F04B 41/06 |
| 2004/0228737 | A1 | 11/2004 | Folchert | |
| 2013/0125743 | A1 * | 5/2013 | Adler | B01D 53/26 |
| | | | | 92/1 |
| 2013/0195682 | A1 * | 8/2013 | Becher | F04B 7/02 |
| | | | | 417/307 |
| 2013/0255240 | A1 | 10/2013 | Bergemann et al. | |
| 2013/0294937 | A1 | 11/2013 | Burkellneilw et al. | |
| 2013/0320645 | A1 | 12/2013 | Gall | |
| 2013/0333969 | A1 * | 12/2013 | Dieckmann | B60T 17/02 |
| | | | | 180/165 |
| 2014/0059876 | A1 | 3/2014 | Folchert et al. | |
| 2014/0241859 | A1 | 8/2014 | Hein | |
| 2016/0138838 | A1 * | 5/2016 | Simross | F04B 39/16 |
| | | | | 62/335 |
| 2020/0049137 | A1 * | 2/2020 | Scharpenberg | F04B 25/005 |
| 2020/0124042 | A1 * | 4/2020 | Stabenow | F04B 41/06 |
| 2020/0376914 | A1 * | 12/2020 | Stabenow | B60G 17/0528 |

FOREIGN PATENT DOCUMENTS

| | | |
|---|---|---|
| DE | 102011084921 A1 | 4/2013 |
| DE | 102012005303 A1 | 6/2013 |
| DE | 102012006382 A1 | 10/2013 |
| DE | 102012010390 A1 | 12/2013 |
| DE | 102008034240 B4 | 12/2014 |
| DE | 112013002118 T5 | 1/2015 |

* cited by examiner

METHOD FOR OPERATING A PRESSURE
CONTROL SYSTEM WITH A MULTI-STAGE
COMPRESSOR, AND PRESSURE CONTROL
SYSTEM

CROSS REFERENCE TO RELATED APPLICATIONS

This application is a U.S. National Phase Application under 35 U.S.C. § 371 of International Application No. PCT/EP2018/059459, filed on Apr. 12, 2018, and claims benefit to German Patent Application No. DE 10 2017 004 359.0, filed on May 5, 2017. The International Application was published in German on Nov. 8, 2018 as WO 2018/202402 under PCT Article 21(2).

FIELD

The invention concerns a method for operating a pressure control system with a multistage compressor, in particular in a truck, and further concerns a pressure control system with a multistage compressor.

BACKGROUND

Multistage compressors are used to achieve a high compression of a pressure medium, in particular a gas, for example air, in that the pressure medium that is precompressed in a first compression stage is additionally compressed in a successive second compression stage. Further compression stages may also be provided in a cascade, in which in each case the pressure medium compressed by the preceding compression stage is further compressed.

If consumers, for example a pneumatic suspension system or ride height control system in a vehicle, are to be supplied with pressure medium, such a multistage compressor may be used to provide the pressure medium with a corresponding pressure for supplying compression springs. The multistage compressor here compresses the pressure medium introduced into an intake space from the atmosphere via two or more compression stages, and delivers the pressure medium, compressed in multiple stages, to the compression springs. Alternatively, an already compressed pressure medium from a pressure medium reservoir may be used, which is then compressed a further time by the compressor.

This is described for example in DE 10 2008 034 240 B4, according to which a ride height control system is provided in which a multistage compressor is used to convey the pressure medium from atmosphere or from a pressure medium reservoir, wherein two compression stages are provided. If pressure medium from atmosphere is compressed, the pressure medium is conducted through both compression stages, whereas when conveying pressure medium from the pressure medium reservoir, the pressure medium supplied to the consumer is compressed solely by the second compression stage. In order in this case to reduce or block the compression work of the first compression stage, a shut-off valve is provided which is configured as a 2/2-way directional control valve which, on delivery from the pressure medium reservoir, prevents delivery of compressed pressure medium from the first compression stage to the second compression stage. The shut-off valve is here actuated electrically via a control device.

DE 103 21 771 A1 describes a multistage compressor in which, to disable the first compression stage, a bypass line with a pneumatically controllable shut-off valve is provided, which connects an intake space of the compressor to the first compression space. The pneumatic shut-off valve is here opened depending on the pressure in the intake space, so that a pressure balance between the intake space and the compression space can take place. This serves to disable the first compression stage depending on the pressure of the pressure medium introduced into the intake space. In this way, depending on the introduced pressure medium, in single-stage operation a high compression can be achieved with a low volume flow. In two-stage operation however, a high volume flow is achieved and the pressure medium flows through two compression stages.

According to DE 10 2011 083 614 A1, it is proposed to compress air in two compression stages in an open operating mode and supply the compressed air to a pressure medium reservoir. In a closed operating mode, the already compressed air is transferred from the pressure medium reservoir to an intermediate volume between the first and second compression stages, and compressed again by one of the compression stages in order to then be conveyed to the consumers. Furthermore, a return of air from the consumers to the pressure medium reservoir is provided. Electrically actuated changeover valves are provided for control, which accordingly block and release the flow path for the compressed air or the air to be compressed.

DE 10 2012 010 390 A1 describes a ride height control system in which, in a closed operating mode, air already compressed by a compressor is supplied from the pressure storage container into consumers configured as spring struts. To control the pressure in the ride height control system, a pressure-limiting function is provided either in the form of an outlet valve or in the form of a pre-control valve, each of which release air to the atmosphere when the pressure in the system is too high.

SUMMARY

In an embodiment, the present invention provides a method for operating a pressure control system having a multistage compressor. The method comprises providing a pressure medium compressed multiple times by the multistage compressor in order to fill a pressure medium reservoir or pressure medium chambers of the pressure control system, by performing (i) providing, by a first compression stage, a precompressed pressure medium and additionally compressing the precompressed pressure medium via a second compression stage, and/or (ii) introducing, into an intermediate volume between the first compression stage and the second compression stage of the multistage compressor, an already compressed charge pressure medium and compressing, by the second compression stage, the charge pressure medium again. An intermediate pressure of the precompressed pressure medium conveyed into the intermediate volume is limited by an overpressure valve interacting with the first compression stage. The overpressure valve is configured to open if the intermediate pressure exceeds a limit value, and the precompressed pressure medium is thereby partly discharged from the first compression stage for automatic adaptation of the compression power of the first compression stage by the precompressed pressure medium.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
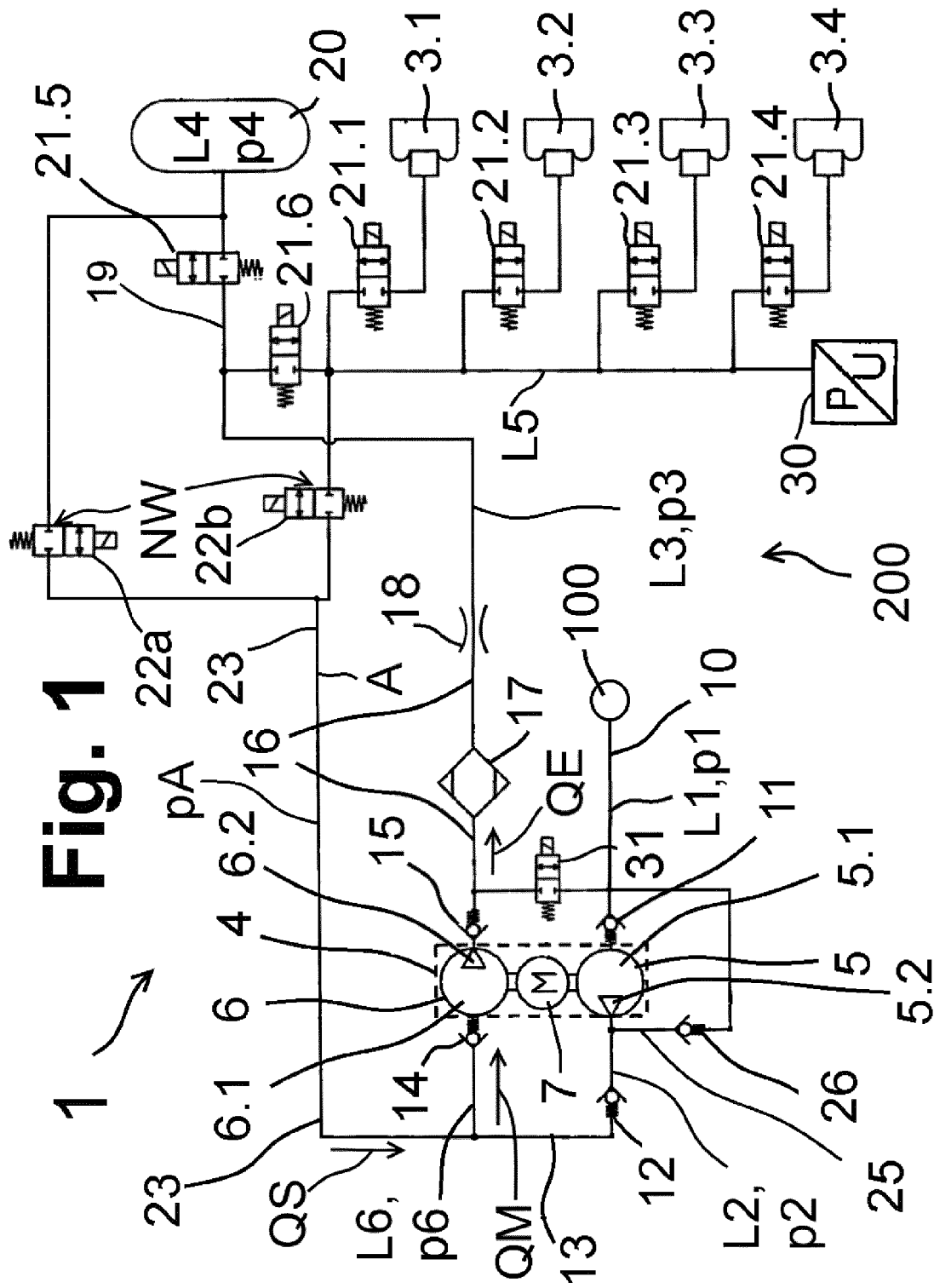
FIG. 1 illustrates a pneumatic suspension system with a two-stage compressor according to an embodiment of the invention.

The invention provides a method for operating a pressure control system with a multistage compressor which, in a simple and reliable fashion, matches a compression power and a compressed volume flow of the multistage compressor to the operating modes of the pressure control system. The invention further provides a pressure control system with a multistage compressor.

According to the invention, it is proposed that a compression power of a first compression stage of a multistage compressor is reduced or restricted by an overpressure valve, in particular in a closed operating mode of a pressure control system, in particular a pneumatic suspension system in a vehicle. According to the invention, this can be achieved through limiting, by the overpressure valve in self-regulating fashion, an intermediate pressure of a precompressed pressure medium conveyed by the first compression stage, so that the first compression stage contributes only to a limited extent to a total compression power of the multistage compressor, in particular in the closed operating mode, and thus the portion of the first compression stage in the energy consumption of the multistage compressor in the closed operating mode can be reduced or limited.

In this way, the advantage can already be achieved that the compression power of the first compression stage can be adapted, simply and reliably in self-regulating or automatic fashion, on changeover to the closed operating mode of the pressure control system when the pressure medium precompressed in the first compression stage reaches a specific limit pressure, since the overpressure valve then opens automatically. Thus there is no need to actuate additional valves by a pneumatic or electronic system.

The first compression stage is not necessarily the compression stage lying at the start in the flow direction in the multistage compressor. Rather, this means that the first compression stage may be any compression stage in the multistage compressor which is followed by at least one further compression stage, i.e. a second compression stage, wherein this does not necessarily adjoin the first compression stage in the sense of the invention. The second compression stage thus lies behind the first compression stage only in the flow direction, wherein the second compression stage should not necessarily be regarded as the last compression stage of the multistage compressor.

The overpressure valve can be configured as a differential pressure valve, such as a check valve, for example a ball check valve with a ball which presses against a constriction under spring force and opens above a limit pressure dependent on the spring force. This ensures a simple and economic design. By corresponding setting or design of the overpressure valve, the limit pressure can thus also be set variably in order to adapt the compression power to the respective requirements in simple fashion.

In an open operating mode of the pressure control system, the multistage compressor provides pressure medium, for example intake air provided via an intake line from the atmosphere, precompressed by the first compression stage for example to an intermediate pressure of 5-6 bar, at a stabilization pressure of the first compression stage of for example 10-15 bar, and introduces this into an intermediate volume. From there, the precompressed air enters a second compression stage in which it is further compressed, for example to a final pressure of 20 bar, and from which it passes via an air dryer into one or more consumers, for example air springs of the pressure control system, and/or into a pressure medium reservoir. Thus the total compression power in the open operating mode is determined in particular by the two compression stages, wherein as already stated, further compression stages may also be present.

The closed operating mode is set in particular if the consumers of the pressure control system are to be supplied with highly compressed and/or dried pressure medium. This is the case in particular if rapid pressurization of the consumers is desired, for example if rapid adjustment by the pneumatic suspension control system is necessary by provision of a high final volume flow, i.e. a high quantity of air per time from the second or last compression stage. Also, the closed operating mode may be set if pressure medium is to be returned from the consumers to the pressure medium reservoir, since renewed compression must then also be guaranteed.

To switch from open operating mode to closed operating mode, for example a changeover valve connecting the pressure medium reservoir or consumers to the storage line is opened, so that already compressed pressure medium, referred to below as charge pressure medium, can flow into the storage line. The charge pressure medium may firstly be the pressure medium stored in the pressure medium reservoir, which has already been compressed to a reservoir pressure. If however, in closed operating mode, the already compressed pressure medium is to be returned from the consumers to the pressure medium reservoir, the pressure medium from the consumers is the charge pressure medium which is introduced into the storage line. For this, two separate changeover valves may be provided for the consumers and the pressure medium reservoir for controlling the inflow into the storage line.

According to the invention, the charge pressure medium can enter the intermediate volume between the first and second compression stages via the storage line. In the intermediate volume, a pressure prevails which is slightly lower than the reservoir pressure in the pressure medium reservoir or the pressure in the consumers, since the pressures diminish on flowing through the changeover valve and storage line. In closed operating mode therefore, the already highly compressed charge pressure medium may be additionally compressed by the second compression stage.

A storage volume flow of the already compressed charge pressure medium introduced into the storage line, i.e. an air quantity per time introduced into the intermediate volume, is here in particular dependent on a nominal width of the changeover valve and in some cases further upstream valves through which the charge pressure medium flows. The storage volume flow in turn also determines the final volume flow of the pressure medium conveyed by the second or final compression stage. Both volume flows may be designed higher due to the energy saving in the first compression stage:

Because the compression power and hence also the energy consumption of a motor of the multistage compressor of the first compression stage can be reduced or limited in the closed operating mode, this energy transfer may be used additionally to operate the second compression stage up to an acceptable maximum energy limit, in particular a current limit of for example 35 A. For example, the nominal width of the changeover valve and hence the storage volume flow may be designed higher without exceeding the acceptable maximum energy limit. Consequently, an effective power of the pressure control system can be increased, since for the same acceptable electrical power, a significantly higher final volume flow through the second compression stage can be guaranteed for the same energy input.

As soon as, in closed operating mode, the charge pressure medium is introduced into the intermediate volume, the first compression stage attempts to provide a precompressed pressure medium which is compressed up to the charge pressure of the charge pressure medium prevailing in the intermediate volume. According to the invention, this can be prevented by the overpressure valve, since delivery of precompressed pressure medium from the first compression stage into the intermediate volume is possible only up to a specific limit pressure, for example 5 bar or 6 bar. For this, the overpressure valve opens as soon as the intermediate pressure of the precompressed pressure medium becomes greater than the limit pressure, wherein the precompressed pressure medium in this case is discharged via a purge line, departing from the overpressure valve, into atmosphere or into the intake line. If an intermediate pressure is established by purging which is lower than the limit pressure, the overpressure valve closes again. The first compression stage thus delivers into the intermediate volume only up to the limit pressure.

Thus in closed operating mode, the intermediate volume contains a mixture of pressure medium, which has been precompressed by the first compression stage, and the respective charge pressure medium from the storage line. In this way, a mixed pressure medium with a mixed volume flow and a mixed pressure, composed of the respective volume flows and pressures, can be conveyed from the intermediate volume to the second compression stage. In open operating mode, the mixed pressure medium comprises solely the pressure medium which has been precompressed by the first compression stage, since no charge pressure medium is introduced into the intermediate volume.

Thus a power consumption of the first compression stage can be limited since the first compression stage compresses and performs compression work only until the limit pressure is reached. The drive power of a motor of the compressor is thereby automatically reduced or limited, the energy consumption falls and, in closed operating mode, can be matched primarily to the operation of the second or further compression stages and hence to the final volume flow.

In closed operating mode, the majority of the total compression power is achieved by compression of the charge pressure medium introduced from the storage line into the intermediate volume and not conveyed by the first compression stage. The precompressed pressure medium thus contributes only to a slight proportion with at most the limit pressure. An inflow of charge pressure medium from the intermediate volume back into the first compression stage can be prevented by a first outlet valve in the first compression stage, for example a check valve opening towards the intermediate volume. Thus no pressure balance takes place between the intermediate volume and the first compression space of the first compression stage.

Furthermore, a pressure medium which has reached a high drying stage may be supplied to the consumers, since the proportion of undried pressure medium, which is conveyed substantially from the first compression stage and hence from the environment, is limited.

Since the precompressed pressure medium also reaches the overpressure valve in open operating mode, in this open operating mode the precompressed pressure medium conveyed into the intermediate volume is also restricted to the limit pressure. Advantageously, the limit pressure is therefore set or the multistage compressor designed such that in open operating mode, no performance loss occurs, in that the limit pressure is matched to the pressure required in the intermediate volume in open operating mode. This is the case for example with a limit pressure of 5 bar, which is necessary for final pressure of 20 bar in open operating mode in order in particular to observe energy specifications, for example a current limitation 35 A, and an established final volume flow of the compressed pressure medium.

Because the overpressure valve switches automatically when the charge pressure medium flows from the pressure medium reservoir or the consumers into the intermediate volume with a high charge pressure, i.e. higher than the intermediate pressure of the precompressed pressure medium, switching takes place without additional complexity or time loss. Since the charge pressure medium is also not supplied to the multistage compressor by the first compression stage, a simple design and reliable operation of the pressure control system can be achieved, since the uncompressed pressure medium in open operating mode and the charge pressure medium in closed operating mode are introduced into the multistage compressor at different locations, and hence no switching of the pressure medium source is required in the first compression stage.

Advantageously, with such an overpressure valve, a simple and economic design of the pressure control system can be achieved with which the efficiency of the compressor can be set optimally, i.e. a high storage volume flow by enlarging the nominal width, in particular of the changeover valve, at a maximal energy consumption which can be set simultaneously, and an at least partially dried pressure medium. Optimal operation of the pressure control system can thus be achieved for closed operating mode by an optimally designed second compression stage, which is filled by the maximal storage volume flow—defined in particular by the nominal width of the changeover valve—and the reduced first compression stage at the power limit of the multistage compressor or upper energy limit.

In addition, for safety, an additional pressure relief valve may be provided in the storage line which establishes a maximum charge pressure in the storage line, wherein the maximum charge pressure may be selected depending on the maximum energy limit so that the second compression stage is not operated beyond its performance limit. In addition, the design of the second compression stage of the multistage compressor can be adapted, in that for example a piston ensuring compression in the second compression stage is designed larger.

The limit pressure preset by the overpressure valve may be set in particular depending on a predefined energy consumption of the pressure control system. For this for example, a previously established upper energy limit can be provided, for example an upper current limit to which the total compression power of the multistage compressor is adapted. The overpressure valve or limit pressure is established such that the first compression stage is used for compression until the established upper energy limit for the compressor is reached. So as not to exceed this, the overpressure valve opens so that the power consumption of the first compression stage does not rise further, and the current consumption remains within the limit values. In this way, the final volume flow and total compression power may be optimally matched to each other with simultaneous observation of energy specifications in closed operating mode.

According to the invention, the multistage compressor can be configured as a piston compressor, wherein a first piston forms a first compression stage and a second piston forms the second compression stage; said stages can be connected together by the intermediate volume, wherein further compression stages with further pistons may be present. Both pistons are moved by a motor via a piston drive in order to successively compress the pressure medium in the corresponding compression space. The pistons have different piston diameters in order to be able to achieve a precompression by the first compression stage and an additional compression by the second compression stage, and in some cases a further compression by further compression stages. The piston compressor is part of a pressure control system which supplies several springs with compressed air via the compression of air as pressure medium, in order for example to achieve springing or raising and lowering of part of the vehicle, wherein this may take place in a closed or open operating mode.

Advantageously, the overpressure valve and the associated transfer lines for adjusting the compressor in closed operating mode can be integrated compactly in a compressor housing, for example a compressor cover. This saves space and weight, and also ensures simple construction with short pneumatic transfer routes and hence low pressure losses. Also advantageously, it is easy to fit the additional pneumatic components into an existing multistage compressor.

According to FIG. 1, a pressure control system is provided, for example a pneumatic suspension system 1, comprising four pressure medium chambers 3.1, 3.2, 3.3, 3.4 which are each assigned to a consumer, for example air springs of the vehicle 200. The pressure medium chambers 3.$i$ are supplied with a compressed pressure medium L3, for example air, wherein the compressed pressure medium L3 is compressed in a two-stage compressor 4, for example a piston compressor shown in FIG. 2.

The two-stage compressor 4 has for this a first compression stage 5 and a second compression stage 6, each of which comprise an intake space 5.1, 6.1 and a compression space 5.2, 6.2, wherein pressure medium L1, L2 flowing into the respective intake space 5.2, 6.2 is compressed. The compression stages 5, 6 are driven by a motor 7, which causes a piston 8, 9 present in the respective compression stage 5, 6 to move up and down and thereby compress the pressure medium L1 present in the intake chamber 5.1, 6.1 accordingly.

The pressure control system 1 in this embodiment may be operated in two operating modes, an open mode BMo and a closed mode BMc, in each of which air is conveyed and compressed as a pressure medium L1, L2, L3, L4, L5. In open mode BMo, intake air L1 is drawn from atmosphere 100, i.e. with an air pressure or intake pressure p1 of around 1 bar, into the first intake space 5.1 of the first compression stage 5 via an intake line 10 and a first inlet valve 11. Then the intake air L1 is precompressed initially by the first piston 8 and conducted into the first compression space 5.2. From the first compression space 5.2, the precompressed air L2 with an intermediate pressure p2 flows into an intermediate volume 13 via a first outlet valve 12, for example a check valve.

From the intermediate volume 13, the precompressed air L2 passes via a second inlet valve 14 into the second intake space 6.1 of the second compression stage 6, from which the precompressed air L2 is compressed further via a second piston 9 (see FIG. 2) and introduced into the second compression space 6.2. From the second compression stage 6, the compressed air L3 with a final pressure p3 passes via a second outlet valve 15 into an outlet line 16 leading to an air dryer 17 and a nozzle 18. Then the outlet line 16 conducts the compressed air L3 to the pressure medium chambers 3.1, 3.2, 3.3, 3.4 of the connected consumers, for example the air springs, and via a reservoir line 19 to a pressure medium reservoir 20, in which the precompressed air L3 is stored as stored air L4 with a reservoir pressure p4, which is slightly lower than the final pressure p3 because of losses.

The pressure medium reservoir 20 and the pressure medium chambers 3.1, 3.2, 3.3, 3.4 can each be connected to the outlet line 16 or reservoir line 19 by a controllable valve 21.1, 21.2, 21.3, 21.4, 21.5, 21.6, for example a 2/2-way magnetic valve, so that depending on the position of the controllable valves 21.$i$, the compressed air L3 can flow into the pressure medium chambers 3.1, 3.2, 3.3, 3.4 in order to control the consumers, or into the pressure medium reservoir 20.

Accordingly when the sixth valve 21.6 is open and the first valve 21.1 is open, the compressed air L3 is conducted into the first pressure medium chamber 3.1; with the second valve 21.2 open, into the second pressure medium chamber 3.2; with the third valve 21.3 open, into the third pressure medium chamber 3.3; and with the fourth valve 21.4 open, into the fourth pressure medium chamber 3.4, wherein the fifth valve 21.5 is closed and hence no compressed air L3 can flow into the pressure medium reservoir 20.

If however valves 21.1, 21.2, 21.3, 21.4, 21.6 are in the closed position and the fifth valve 21.5 is open, compressed air L3, which has been dried in the air dryer 17, can be conducted into the pressure medium reservoir 20 where it is stored. Pressure monitoring may take place by a pressure meter 30. The compressed air L3 may be discharged into the atmosphere 100 via an additional outlet valve 31.

In closed operating mode BMc, the air L4 stored in the pressure medium reservoir 20 may be introduced into the intermediate volume 13 as charge pressure medium A, so that the already compressed air L4 is compressed a further time. For this, according to this embodiment, the fifth valve 21.5 is closed and a first changeover valve 22$a$, which is arranged in a storage line 23 branching off between the first valve 21.5 and the pressure medium reservoir 20, is opened. The storage line 23 is connected to the intermediate volume 13, so that in the open position of the first changeover valve 22$a$, the stored air L4 as charge pressure medium A can flow into the intermediate volume 13 and into the second intake space 6.1, in order to be compressed again by the second compression stage 6. The first outlet valve 12 prevents an inflow of stored air L4 into the first compression stage 5 since it closes in this direction.

If, in closed operating mode BMc, a return of chamber air L5 from the pressure medium chambers 3.$i$ into the pressure medium reservoir 20 is desired, the valve 21.$i$ (with i=1 . . . 4) assigned to the respective pressure medium chamber 3.$i$, and a second changeover valve 22$b$, are opened and the sixth valve 21.6 is closed, so that the chamber air L5 is introduced into the storage line 23 as charge pressure medium A. The first changeover valve 22$a$ in this case is also closed, and the fifth valve 21.5 opened in order to allow a return to the pressure medium reservoir 20. If only compression of stored air L4 is provided in the pressure control system 1, the path via the second changeover valve 22b may also be omitted.

A nominal width NW of the changeover valves 22a, 22b is here selected for example between 1 mm and 4 mm, so that a high storage volume flow QS into the intermediate volume 13 may be set.

Since, in closed operating mode BMc, the first compression stage 5 is not necessarily required for precompression, as the (pre)compressed charge pressure medium A has already been introduced into the intermediate volume 13 via the storage line 23, according to the invention the compression power of the first compression stage 5 is restricted, which means that air L2 precompressed by the first compression stage 5 is not conveyed to the full extent from the first compression space 5.2 through the outlet valve 12 into the intermediate volume 13. In this way, the pressure of the precompressed pressure medium L2 conveyed into the intermediate volume 13 is limited to an established limit pressure pG by an overpressure valve 26 interacting with the first compression stage 5.

For this, a purge line 25 branches off between the first outlet valve 12 and the first compression space 5.2, and opens either into the intake line 10 or into the atmosphere 100. The overpressure valve 26, for example a check valve which opens above a limit pressure pG, is arranged in the purge line 25. The overpressure valve 26 is controlled depending on the intermediate pressure p2 of the pressure medium L2 which has been precompressed in the first compression stage 5.

As soon as the respective changeover valve 22a, 22b is opened in order to activate the closed operating mode BMc and operate the pneumatic suspension system 1 with the stored air L4 or return the consumer air L5, the compression power of the first compression stage 5 is automatically restricted by the overpressure valve 26 in that a delivery of precompressed pressure medium L2 is limited to the limit pressure pG. For this, the precompressed air L2 present in the first compression space 5.2, above the limit pressure pG, is returned at least partially into the intake line 10 or optionally into the atmosphere 100, so that less precompressed air L2 is conveyed into the intermediate volume 13 through the first outlet valve 12. Compression thus takes place primarily via the second compression stage 6 in order to supply the pressure medium chambers 3.i with air or achieve a return to the pressure medium reservoir 20.

The overpressure valve 26 is preferably configured as a differential pressure valve, in particular a ball check valve with a spring, wherein the spring presses a ball against a valve opening. As soon as the pressure in the purge line 25 is higher than the limit pressure pG, the ball releases the valve opening so that precompressed air L2 can flow through the overpressure valve 26 and thereby the pressure of the first compression stage 5 can be limited.

In this way, in closed operating mode BMc, a power limitation can be achieved by which the energy consumption of the compressor 4 can be adapted or minimized, since precompression of the intake air L1 to the charge pressure pA prevailing in the intermediate volume 13 is not required. The required power consumption of the motor 7 of the compressor 4 is thereby limited, since the first piston 8 has less compression work to perform. This may be used to optimize the second compression stage 6 so as to allow optimal setting in particular of a final volume flow QE of the second compression stage 6, and of a piston diameter D2 of the second compression stage 6. This can be achieved in particular in that a nominal width NW of for example 1 mm is used for the changeover valves 22a, 22b, so that the storage volume flow QS in the intermediate volume 13 is increased and hence also the final volume flow QE rises.

In closed operating mode BMc, a mixed pressure medium L6 is present in the intermediate volume 13, which contains proportionally the charge pressure medium A and the precompressed pressure medium L2 with at most the limit pressure pG. The mixed pressure medium L6 is conveyed into the second compression stage 6 with a mixed pressure p6 and a mixed volume flow QM, which are defined by the respective pressures and volume flows of the charge pressure medium A and precompressed pressure medium L2.

In open operating mode BMo however, only the precompressed air L2 with the intermediate pressure p2 is conveyed into the second compression stage 6 through the intermediate volume 13, without being mixed with the charge pressure medium A. The mixed pressure medium L6 thus comprises solely the precompressed air L2 with the intermediate pressure p2 which corresponds at most to the limit pressure pG.

Figure 2:
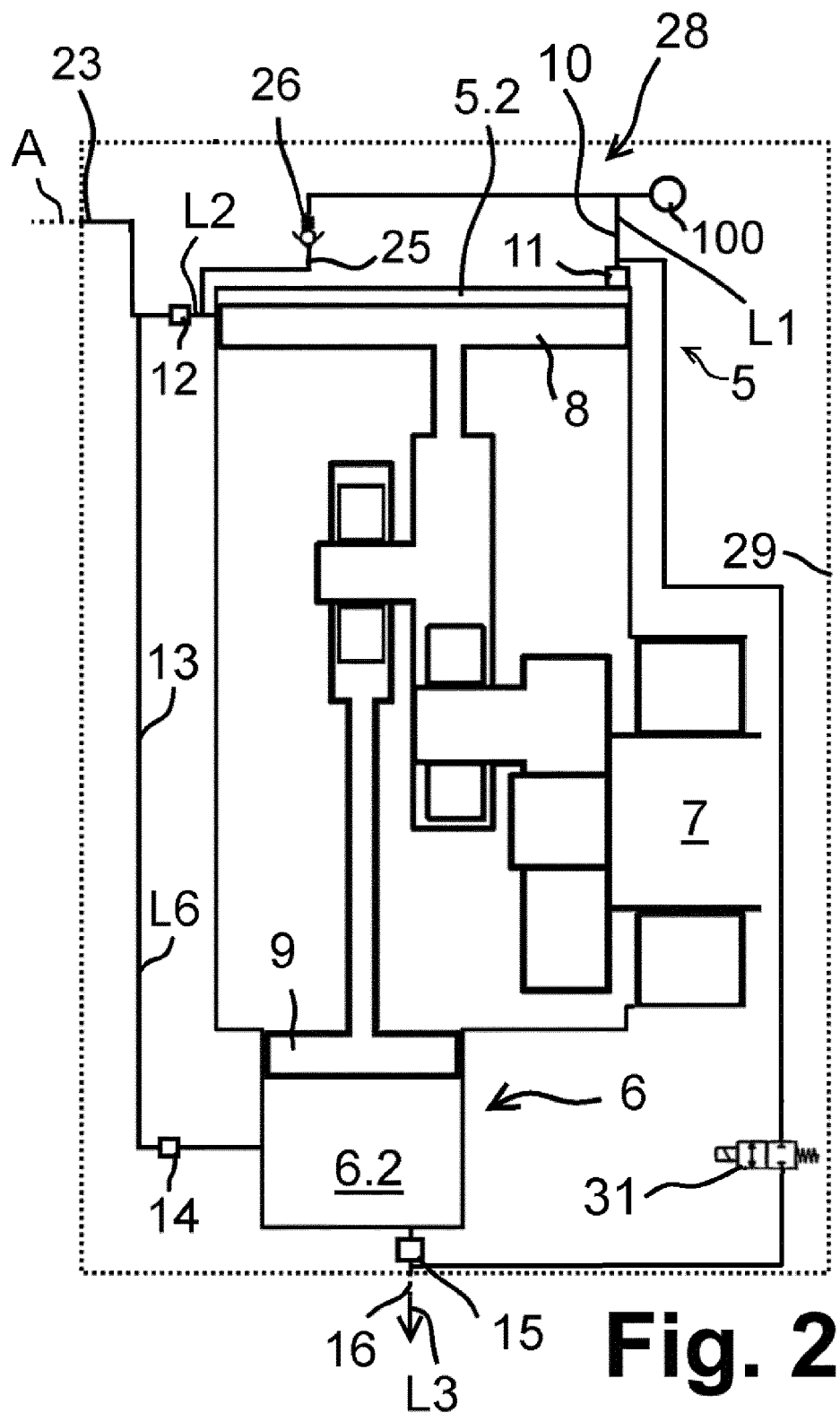
FIG. 2 illustrates a two-stage compressor with an integrated overpressure valve according to an embodiment of the invention.

According to FIG. 2, the multistage piston compressor 4 is shown diagrammatically with the first and second compression stages 5, 6. The two compression stages 5, 6 are connected together by the intermediate volume 13 so that, in particular in operating mode BMo, the air L2, which has been precompressed in the first compression stage 5 by the first piston 8, can be conveyed into the second compression stage 6 in order to be compressed further there by the second piston 9.

In closed operating mode BMc, the charge pressure medium A is conducted into the intermediate volume 13 via the storage line 23. The overpressure valve 26, the storage line 23 and the purge line 25 may be arranged compactly for example in the compressor cover 28 of the compressor housing 29.

Figure 3:
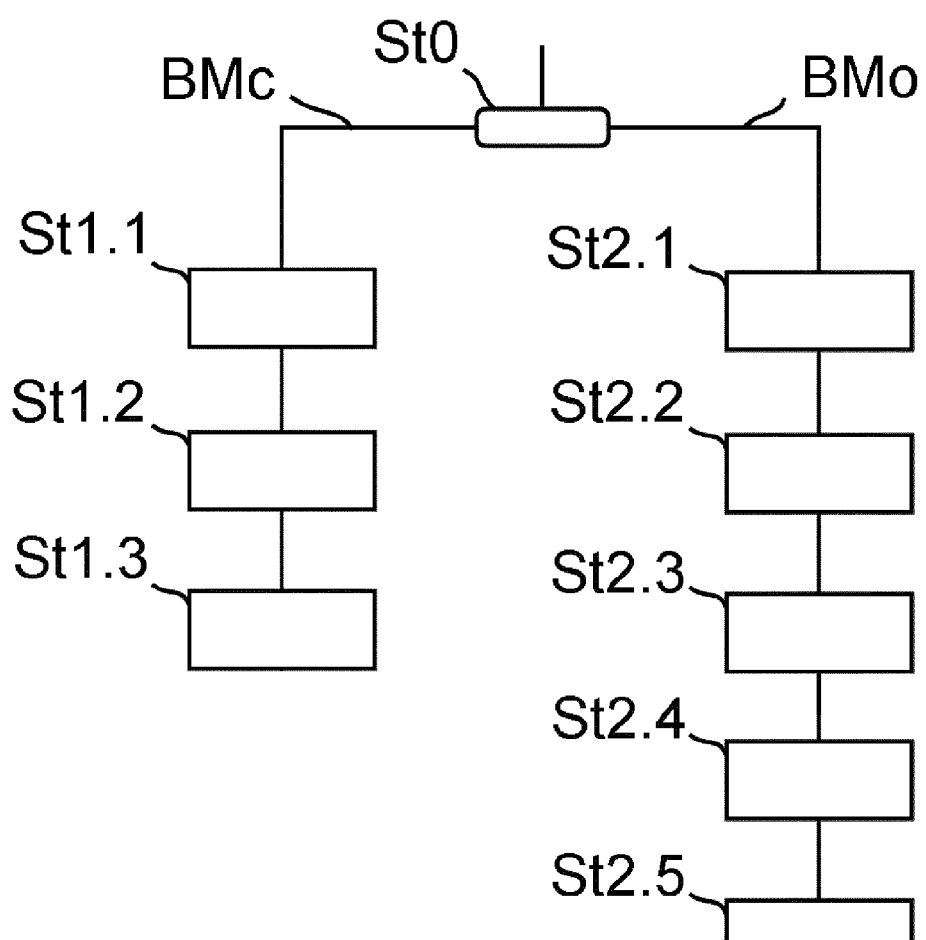
FIG. 3 illustrates a flow diagram for a method according to an embodiment of the invention.

According to FIG. 3, the method according to the invention for operating the pneumatic suspension system in closed operating mode BMc may be carried out as follows:

In an initial step St0, it is checked which operating mode BMo, BMc of the pressure control system 1 is set.

If the closed operating mode BMc of the pressure control system 1 is set, in a first step St1.1, the charge pressure medium A is released via the respective changeover valve 22a, 22b and introduced via the storage line 23 into the intermediate volume 13, from where it is compressed again by the second compression stage 6. Inflow into the first compression stage 5 is prevented by the outlet valve 12.

In a second step St1.2, the compressor 4 compresses the intake air L1 via the first compression stage 5; via the intermediate volume 13, this is then compressed again together with the charge pressure medium A (see step St1.1) by the second compression stage 6, so that a mixture (mixed pressure medium L6) of precompressed air L2 and charge pressure medium A is conveyed. As soon as the precompressed air L2 reaches a limit pressure pG, the overpressure valve 26 opens in a third step St1.3 so that the pressure medium L2, which has been precompressed by the first compression stage 5, is partially discharged into the intake line 10 or the atmosphere 100. The other part of the precompressed air L2 passes into the intermediate volume 13. The pressure of the air L2 conveyed by the first compression stage 5 into the intermediate volume 13 is thereby limited, and the compression power is limited. This energy gain may be used for optimal setting of the second compression stage 6.

In open operating mode BMo, the intake air L1 from the atmosphere 100 reaches the first compression stage 5 in a step St2.1. In the first compression stage 5, the intake air L1 is precompressed to the intermediate pressure p2 in a second step St2.2, and introduced into the intermediate volume 13 in a third step St2.3. From the intermediate volume 13, the precompressed pressure medium L2 reaches the second compression stage 6, where it is compressed again in a fourth step St2.4 to the final pressure p3. In a final step St2.5, the compressed pressure medium L3 reaches the pressure medium chambers 3.i or the pressure medium reservoir 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Pneumatic suspension system
3.i Pressure medium chambers
4 Two-stage compressor
5 First compression stage
5.1 First intake space
5.2 First compression space
6 Second compression stage
6.1 Second intake space
6.2 Second compression space
7 Motor
8 First piston of first compression stage
9 Second piston of second compression stage
10 Intake line
11 First inlet valve
12 First outlet valve
13 Intermediate volume
14 Second inlet valve
15 Second outlet valve
16 Outlet line
17 Air dryer
18 Nozzle
19 Reservoir line
20 Pressure medium reservoir
21.i Controllable valves
22a First changeover valve
22b Second changeover valve
23 Storage line
25 Purge line
26 Overpressure valve
28 Compressor cover
29 Compressor housing
30 Pressure meter
31 Outlet valve
100 Atmosphere
200 Vehicle
A Charge pressure medium
BMo Open operating mode
BMc Closed operating mode
L1 Intake air
L2 Precompressed air
L3 Compressed air
L4 Stored air
L5 Chamber air
L6 Mixed pressure medium
NW Nominal width
pA Charge pressure
p1 Air pressure/intake pressure
p2 Intermediate pressure
p3 Final pressure
p4 Reservoir pressure
p6 Mixed pressure
pG Limit pressure
QE Final volume flow
QM Mixed volume flow
QS Storage volume flow
St1.1, St1.2, St1.3 Steps of method in BMc
St2.1, St2.2, St2.3, St2.4, St2.5 Steps of method in BMo

The invention claimed is:

1. A method for operating a pressure control system having a multistage compressor, the method comprising:
providing a pressure medium compressed multiple times by the multistage compressor in order to fill a pressure medium reservoir or pressure medium chambers of the pressure control system, by performing:
providing, by a first compression stage, a precompressed pressure medium and additionally compressing the precompressed pressure medium via a second compression stage, and/or
introducing, into an intermediate volume between the first compression stage and the second compression stage of the multistage compressor, an already compressed charge pressure medium and compressing, by the second compression stage, the charge pressure medium,
wherein an intermediate pressure of the precompressed pressure medium conveyed into the intermediate volume is limited by an overpressure valve interacting with the first compression stage, and
wherein the overpressure valve is configured to open if the intermediate pressure exceeds a limit value, and the precompressed pressure medium is thereby partly discharged from the first compression stage for automatic adaptation of a compression power of the first compression stage by the precompressed pressure medium.

2. The method as claimed in claim 1, wherein the precompressed pressure medium is conveyed into the intermediate volume up to a limit pressure of maximum 6 bar.

3. The method as claimed in claim 1, wherein the charge pressure medium is introduced into a storage line by opening a controllable changeover valve.

4. The method as claimed in claim 1, wherein the multistage compressor provides a mixture of the charge pressure medium and the precompressed pressure medium when the charge pressure medium is introduced into the intermediate volume.

5. A pressure control system, comprising
a multistage compressor with a first compression stage configured to provide a precompressed pressure medium and a second compression stage configured to provide a compressed pressure medium, wherein the first compression stage and the second compression stage are connected together via an intermediate volume for conveying configured to convey the precompressed pressure medium into the second compression stage,
at least one pressure medium chamber connected to the second compression stage,
a pressure medium reservoir connected to the second compression stage and configured to store the compressed pressure medium,
a storage line connecting the pressure medium reservoir or the at least one pressure medium chamber to the intermediate volume for operation of the pressure control system with pressure medium stored in the pressure medium reservoir or for return of a chamber pressure medium used in the pressure medium chambers to the pressure medium reservoir, and
an overpressure valve arranged in a purge line branching from the first compression stage, the overpressure valve being configured to perform self-regulating adaptation of a compression power of the first compression stage by discharging the pressure medium which has been precompressed by the first compression stage, via the purge line if an intermediate pressure of the precompressed pressure medium falls below a limit value.

6. The pressure control system as claimed in claim 5, wherein the overpressure valve is a differential pressure valve.

7. The pressure control system as claimed in claim 5, wherein the limit pressure of the overpressure valve can be set variably.

8. The pressure control system as claimed in claim 5, wherein a controllable first changeover valve is provided in the storage line and configured to release the stored pressure medium as a charge pressure medium into the storage line, and
wherein a controllable second changeover valve is provided and configured to release the chamber pressure medium as a charge pressure medium into the storage line, wherein the respective released charge pressure medium reaches the intermediate volume from the storage line.

9. The pressure control system as claimed in claim 8, wherein a nominal width of the changeover valves lies between 1 mm and 4 mm in order to increase a storage volume flow in the first intermediate volume and a final volume flow from the second compression stage.

10. The pressure control system as claimed in claim 5, wherein the purge line branches off between a first outlet valve and a first compression space of the first compression stage.

11. The pressure control system as claimed in claim 5, wherein the overpressure valve and the purge line are integrated in a compressor housing of the multistage compressor.

12. The pressure control system as claimed in claim 5, wherein the pressure control system is a pneumatic suspension system in a vehicle.

13. A vehicle, having a pressure control system as claimed in claim 5.

* * * * *